(12) United States Patent
Sakagawa et al.

(10) Patent No.: US 12,037,074 B2
(45) Date of Patent: Jul. 16, 2024

(54) CONTROL DEVICE, SUSPENSION, AND METHOD FOR CONTROLLING SUSPENSION

(71) Applicant: Shimano Inc., Osaka (JP)

(72) Inventors: Yuki Sakagawa, Osaka (JP); Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 813 days.

(21) Appl. No.: 17/034,476

(22) Filed: Sep. 28, 2020

(65) Prior Publication Data

US 2021/0107588 A1   Apr. 15, 2021

(30) Foreign Application Priority Data

Oct. 15, 2019 (JP) ................................. 2019-188892

(51) Int. Cl.
*B62K 25/04* (2006.01)
*B62J 45/20* (2020.01)
*B62J 45/41* (2020.01)

(52) U.S. Cl.
CPC ............... *B62K 25/04* (2013.01); *B62J 45/20* (2020.02); *B62J 45/41* (2020.02); *B62K 2025/044* (2013.01)

(58) Field of Classification Search
CPC ........ B62K 25/00; B62K 25/04; B62K 25/28; B62J 45/00; B62J 45/20; B62J 45/41; B62J 43/28; B62J 1/00; B62J 1/08; B62H 1/12; B60G 17/06; B60G 17/08; B60G 21/00
See application file for complete search history.

(56) References Cited

U.S. PATENT DOCUMENTS

| | | | |
|---|---|---|---|
| 6,634,664 B1 * | 10/2003 | Kojima | B62J 15/02 280/852 |
| 2011/0012317 A1 | 1/2011 | Mouri et al. | |
| 2012/0080249 A1 * | 4/2012 | Yates, III | B60L 50/90 701/22 |
| 2014/0088828 A1 | 3/2014 | Wesling et al. | |
| 2014/0249720 A1 * | 9/2014 | Sintorn | B62K 21/08 701/41 |
| 2019/0092421 A1 | 3/2019 | Nichols | |
| 2020/0070613 A1 * | 3/2020 | Tokuhara | B60G 15/062 |

FOREIGN PATENT DOCUMENTS

| | | | | |
|---|---|---|---|---|
| CA | 2250978 A1 * | 4/1999 | ............ | B60W 10/02 |
| DE | 10 2019 112 510 A1 | 11/2019 | | |
| EP | 1201533 A2 * | 5/2002 | .............. | B62J 15/02 |
| EP | 3650250 A1 * | 5/2020 | ........... | B60G 15/062 |
| EP | 4026760 A1 * | 7/2022 | .............. | B62H 1/12 |
| JP | 60-244688 A | 12/1985 | | |
| WO | WO-2012149980 A1 * | 11/2012 | .............. | B62D 1/02 |

\* cited by examiner

*Primary Examiner* — Yonel Beaulieu
(74) *Attorney, Agent, or Firm* — Global IP Counselors, LLP

(57) ABSTRACT

A control device is provided for controlling a suspension of a human-powered vehicle. The control device includes comprises an electronic controller. The suspension includes a first member, a second member movable relative to the first member, and an adjustment unit adjusting a relative movable amount of the first member and the second member. The electronic controller is configured to electrically control the adjustment unit in accordance with relative position information related to a relative position of the first member and the second member.

11 Claims, 7 Drawing Sheets

CONTROL DEVICE, SUSPENSION, AND METHOD FOR CONTROLLING SUSPENSION

CROSS-REFERENCE TO RELATED APPLICATIONS

This application claims priority to Japanese Patent Application No. 2019-188892, filed on Oct. 15, 2020. The entire disclosure of Japanese Patent Application No. 2019-188892 is hereby incorporated herein by reference.

BACKGROUND

Technical Field

The present invention generally relates to a control device, a suspension, and a method for controlling the suspension.

Background Information

A known control device controls a component of a human-powered vehicle. U.S. Patent Application Publication No. 2011/0012317 (Patent Document 1) discloses the configuration of a control device that controls a suspension for a human-powered vehicle.

SUMMARY

It is desirable that the component of the human-powered vehicle be controlled in a further preferred manner. One object of the present disclosure is to provide a control device, a suspension, and a method for controlling the suspension that improve usability.

A control device in accordance with a first aspect of the present disclosure is for a suspension of a human-powered vehicle. The suspension includes a first member, a second member movable relative to the first member, and an adjustment unit adjusting a relative movable amount of the first member and the second member. The control device comprises an electronic controller configured to electrically control the adjustment unit in accordance with relative position information related to a relative position of the first member and the second member.

The control device according to the first aspect controls the adjustment unit in accordance with the relative position information. This improves the usability of the human-powered vehicle.

In accordance with a second aspect of the present disclosure, the control device according to the first aspect further comprises a detector configured to detect the relative position information.

The control device according to the second aspect further includes the detector. Thus, the relative position information is obtained in a further preferred manner.

In accordance with a third aspect of the present disclosure, the control device according to the second or third aspect is configured so that the suspension further includes a first chamber defined by the first member and the second member, a second chamber defined by the first member and the second member, and a flow passage fluidly connecting the first chamber and the second chamber. The adjustment unit includes a valve that opens and closes the flow passage, and the electronic controller is configured to control the valve in accordance with the relative position information.

The control device according to the third aspect controls the valve in accordance with the relative position information. Thus, the amount of fluid in the first chamber and the second chamber is adjusted in a preferred manner.

In accordance with a fourth aspect of the present disclosure, the control device according to the third aspect is configured so that the electronic controller is configured to control the valve in accordance with a comparison result of predetermined relative position information of the first member and the second member and the relative position information.

The control device according to the fourth aspect controls the valve in accordance with the comparison result of the predetermined relative position information and the relative position information. Thus, the valve is controlled in a preferred manner.

In accordance with a fifth aspect of the present disclosure, the control device according to the fourth aspect is configured so that the predetermined relative position information is predetermined in accordance with a predetermined relative movable amount of the first member and the second member.

The control device according to the fifth aspect appropriately predetermines the predetermined relative position information. Thus, the adjustment unit is controlled in a preferred manner.

In accordance with a sixth aspect of the present disclosure, the control device according to the fifth aspect further comprises a storage that stores table data indicating a corresponding relationship of the predetermined relative position information and the predetermined relative movable amount.

The control device according to the sixth aspect allows for the electronic controller to control the adjustment unit in accordance with the table data stored in the storage.

In accordance with a seventh aspect of the present disclosure, the control device according to any one of the third to sixth aspects is configured so that the adjustment unit includes an electric actuator that opens and closes the valve. Further, the electronic controller controls the electric actuator.

The control device according to the seventh aspect controls the valve with the electric actuator in a preferred manner.

A suspension in accordance with an eighth aspect of the present disclosure comprises the control device according to any one of the first to seventh aspects, the first member, the second member movable relative to the first member, and the adjustment unit adjusting the relative movable amount of the first member and the second member.

With the suspension according to the eighth aspect, the control device adjusts the relative movable amount of the suspension. Thus, the usability of the human-powered vehicle is improved.

A suspension control method in accordance with a ninth aspect of the present disclosure is a method for controlling a suspension for a human-powered vehicle. The suspension includes a first member, a second member movable relative to the first member, and an adjustment unit adjusting a relative movable amount of the first member and the second member. The suspension control method comprises: detecting relative position information related to relative position of the first member and the second member; comparing the relative position information and predetermined relative position information; and controlling the adjustment unit in accordance with a comparison result of the relative position information and the predetermined relative position information.

With the suspension control method in accordance with the ninth aspect, the adjustment unit is controlled in a preferred manner. This improves the usability of the human-powered vehicle.

In accordance with a tenth aspect of the present disclosure, the suspension control method according to the ninth aspect further comprises evaluating an adjustment result of the relative movable amount resulting from the controlling of the adjustment unit.

With the suspension control method in accordance with the tenth aspect, the adjustment unit is controlled in a further preferred manner. This improves the usability of the human-powered vehicle.

In accordance with an eleventh aspect of the present disclosure, the suspension control method according to the tenth aspect is configured so that the evaluating of the adjustment result further includes: obtaining pre-control relative position information in accordance with the relative position information detected during a first predetermined period prior to the controlling of the adjustment unit; obtaining post-control relative information in accordance with the relative position information detected during a second predetermined period subsequent to the controlling of the adjustment unit; and evaluating the adjustment result in accordance with a comparison result of the pre-control relative position information and the post-control relative position information.

With the suspension control method in accordance with the eleventh aspect, the adjustment unit is controlled in a further preferred manner. This improves the usability of the human-powered vehicle.

In accordance with a twelfth aspect of the present disclosure, the suspension control method according to any one of the ninth to eleventh aspects further comprises a determining whether to start the detecting of the relative position information.

With the suspension control method in accordance with the twelfth aspect, the adjustment unit is controlled in a further preferred manner. This improves the usability of the human-powered vehicle.

In accordance with a thirteenth aspect of the present disclosure, the suspension control method according to the twelfth aspect is configured so that in the determining of whether to start the detecting of the relative position information is based on at least one of input information from a user, traveling information of a human-powered vehicle, and traveling environment information of the human-powered vehicle.

With the suspension control method according to the thirteenth aspect, the determination of whether to start the detecting of the relative position information is based on at least one of the input information from a user, the traveling information of the human-powered vehicle, and the traveling environment information of the human-powered vehicle. This improves the usability of the human-powered vehicle.

The control device, the human-powered vehicle suspension, and the suspension control method for controlling the suspension improve usability.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
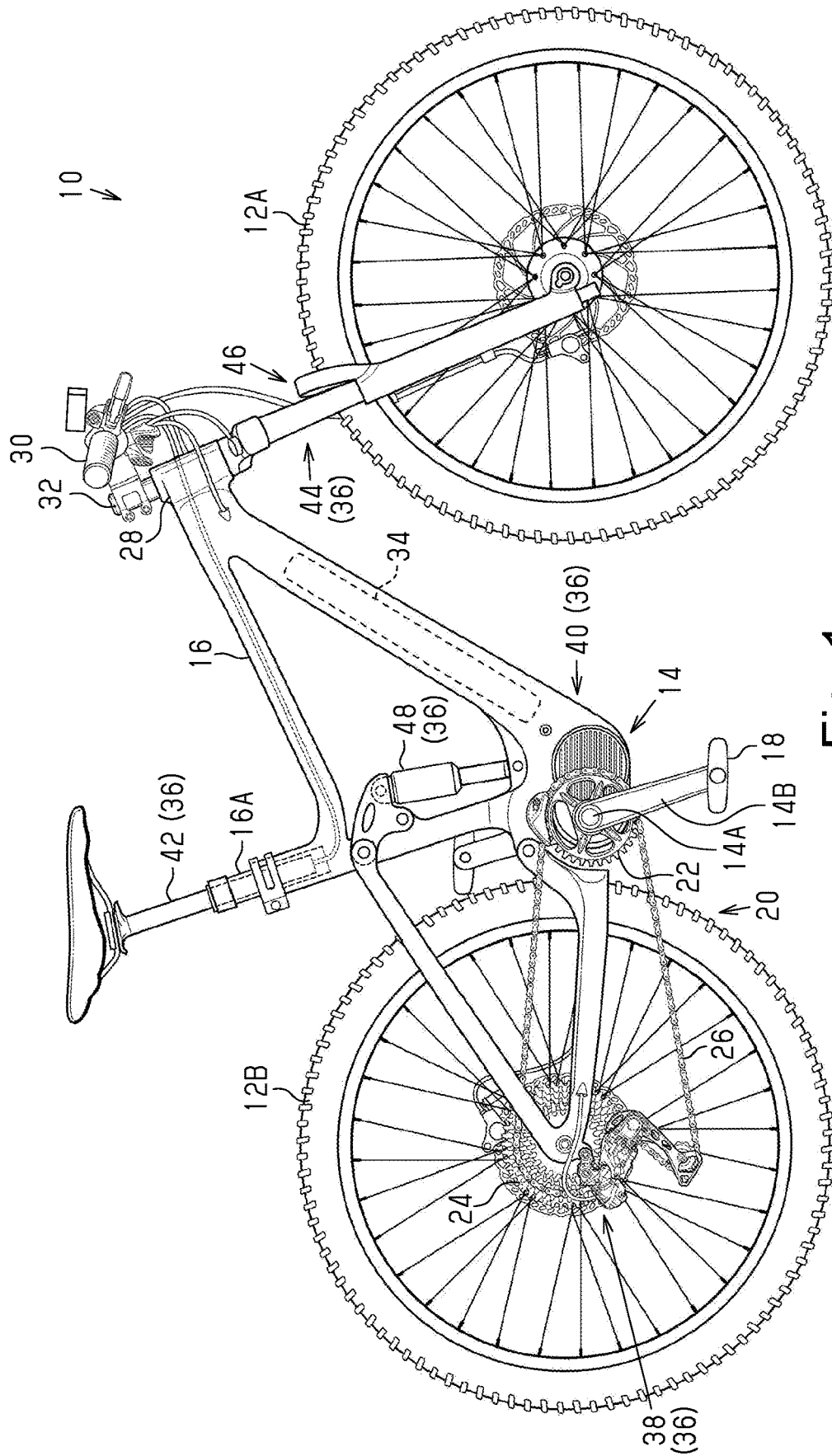
FIG. 1 is a side elevational view of a human-powered vehicle including a control device in accordance with a first embodiment.
Figure 2:
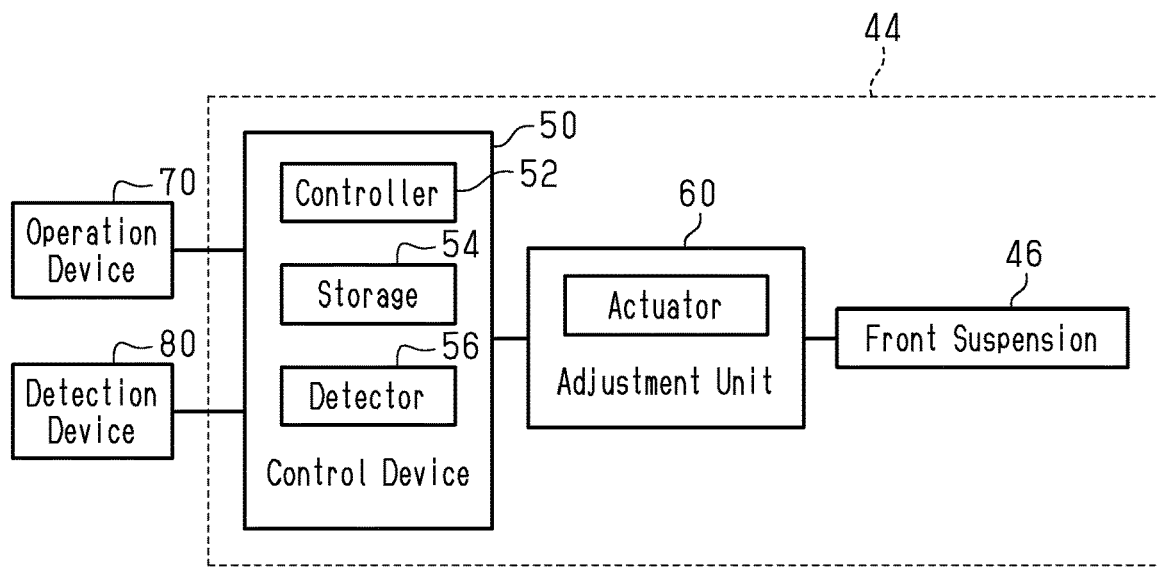
FIG. 2 is a block diagram showing the configuration of the control device shown in FIG. 1.
Figure 3:
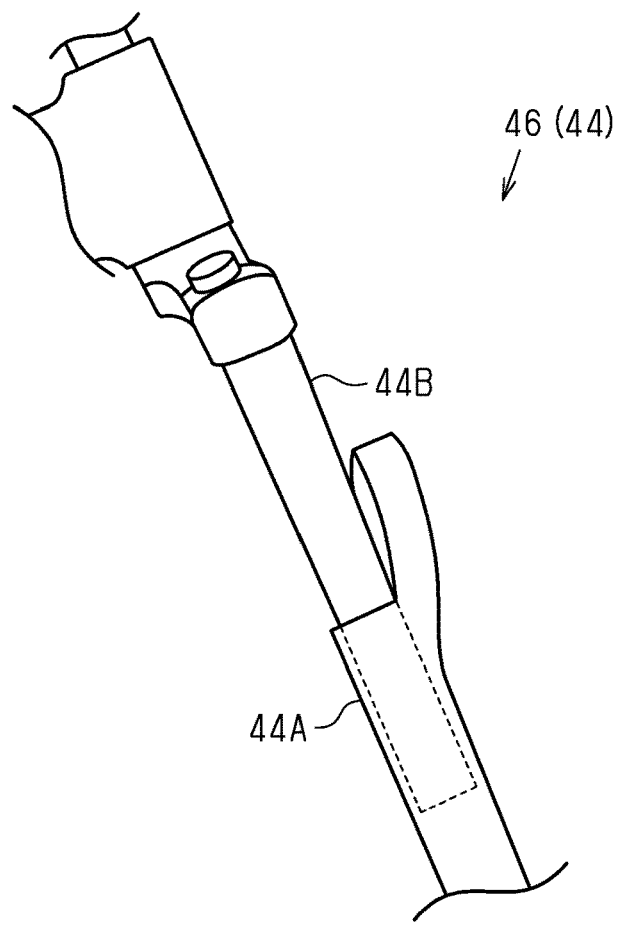
FIG. 3 is an enlarged view showing the structure of a front suspension shown in FIG. 1.
Figure 4:
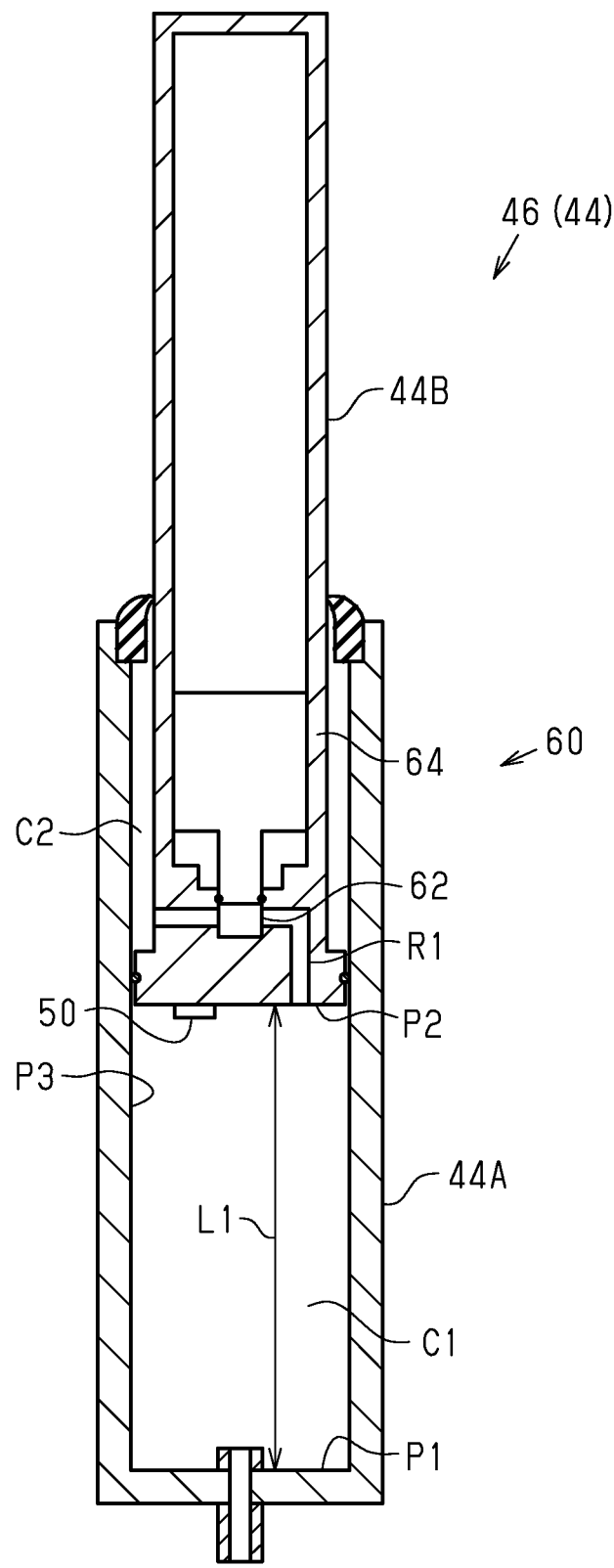
FIG. 4 is a cross-sectional view showing the structure of a suspension.

A human-powered vehicle 10 that includes a human-powered vehicle control device 50 will now be described with reference to FIGS. 1 to 4. Hereinafter, the human-powered vehicle control device 50 will be simply referred to as the control device 50. However, the control device 50 can also be referred to as a suspension control device, a human-powered vehicle suspension control device, or a bicycle suspension control device. The human-powered vehicle 10 shown in FIG. 1 is a vehicle that can be driven by at least human driving force. Examples of the human-powered vehicle 10 include various types of bicycles such as a mountain bike, a road bike, a city bike, a cargo bike, and a recumbent bicycle, as well as an electric bicycle (E-bike). There is no limit to the number of wheels of the human-powered vehicle 10. For example, the human-powered vehicle 10 can be a unicycle or a vehicle having three or more wheels. An electric bicycle includes an electric assist bicycle that assists propulsion of the vehicle with an electric motor. In the embodiments described hereafter, the human-powered vehicle 10 will be referred to as a bicycle.

The human-powered vehicle 10 includes a first wheel 12A and a second wheel 12B. In the present embodiment, the first wheel 12A includes a front wheel, and the second wheel 12B includes a rear wheel. Hereinafter, the first wheel 12A will be referred to as the front wheel 12A, and the second wheel 12B will be referred to as the rear wheel 12B. The human-powered vehicle 10 further includes a crank 14. The human-powered vehicle 10 further includes a frame 16. The human driving force is input to the crank 14. The crank 14 includes a crank axle 14A and two crank arms 14B. The crank axle 14A is rotatably supported by the frame 16. The two crank arms 14B are respectively provided on two axial ends of the crank axle 14A. Two pedals 18 are connected to the two crank arms 14B, respectively. In the present embodiment, the rear wheel is the drive wheel. The drive wheel is driven by the rotation of the crank 14. The drive wheel is supported by the frame 16. The crank 14 is connected to the drive wheel by a drive mechanism 20. The drive mechanism 20 includes a first rotational body 22 coupled to the crank axle 14A. The crank axle 14A can be coupled to the first rotational body 22 by a first one-way clutch. The one-way clutch is configured to rotate the first rotational body 22 in a case where the crank 14 is rotated forward and configured to allow relative rotation of the crank 14 and the first rotational body 22 in a case where the crank 14 is rotated rearward. The first rotational body 22 includes a sprocket, a pulley, or a bevel gear. The drive mechanism 20 further includes a second rotational body 24 and a linking member 26. The linking member 26 is configured to transmit a rotational force of the first rotational body 22 to the second rotational body 24. The linking member 26 includes, for example, a chain, a belt, or a shaft.

The second rotational body 24 is connected to the drive wheel. The second rotational body 24 includes a sprocket, a pulley, or a bevel gear. Preferably, a second one-way clutch is provided between the second rotational body 24 and the drive wheel. The second one-way clutch is configured to rotate the drive wheel forward in a case where the second rotational body 24 is rotated forward and configured to allow relative rotation of the second rotational body 24 and the drive wheel in a case where the second rotational body 24 is rotated rearward.

The second wheel 12B can include the front wheel, and the first wheel 12A can include the rear wheel. The front wheel is attached to the frame 16 by a front fork 28. A handlebar 30 is connected to the front fork 28 by a stem 32. In the following embodiments, the rear wheel will be referred to as the drive wheel. However, the front wheel can be the drive wheel, or both of the front wheel and the rear wheel can be the drive wheels.

The human-powered vehicle 10 includes an electric power supply or battery 34. The battery 34 includes one or more battery cells. Each battery cell includes a rechargeable battery. The battery 34 is configured to supply electric power to the control device 50 and a component 36 (also referred to as a human-powered vehicle component or a bicycle component). Preferably, the battery 34 is connected to the control device 50 via an electric wire or a wireless communication unit in a manner allowing for communication.

The human-powered vehicle 10 further includes the component 36. The component 36 includes at least one of a transmission 38, a drive unit 40 including a motor configured to apply a propulsion force to the human-powered vehicle 10, an adjustable seatpost 42, and a suspension 44. In the present embodiment, the component 36 includes the transmission 38, the drive unit 40, the adjustable seatpost 42, and the suspension 44.

The transmission 38 is configured to change a transmission ratio of a rotational speed of the drive wheel (e.g., the rear wheel 12B) to a rotational speed of the crank axle 14A. Preferably, the transmission 38 is configured to change the transmission ratio in a stepped manner. The transmission 38 includes, for example, at least one of an internal hub transmission device and an external transmission device. The transmission 38 can be provided on, for example, a housing of the drive unit 40.

The drive unit 40 includes a motor. The motor is configured to be controlled by, for example, a controller such as an electric controller or an electronic controller. The motor includes an electric motor. An electric motor includes, for example, a brushless motor. The motor is provided to transmit rotation to the front wheel 12A or to a power transmission path of the human driving force extending from the pedals 18 to the rear wheel 12B. The power transmission path of the human driving force extending from the pedals 18 to the rear wheel 12B includes the rear wheel 12B. In the present embodiment, the motor is provided to transmit rotation to the first rotational body 22. Preferably, a third one-way clutch is provided in the power transmission path between the motor and the crank axle 14A so that the motor is not rotated by the rotational force of the crank 14 in a case where the crank axle 14A is rotated in the direction in which the human-powered vehicle 10 moves forward. In a case where at least one of the rear wheel 12B and the front wheel 12A includes the motor, the motor can include a hub motor. The motor can be configured in any manner as long as the motor is configured to drive at least one of the rear wheel 12B and the front wheel 12A directly or indirectly. The drive unit 40 can further include a speed reducer. The motor can be configured to transmit rotation via the speed reducer to at least one of the front wheel 12A and the power transmission path of the human driving force extending from the pedals 18 to the rear wheel 12B. The speed reducer is provided on, for example, the housing of the drive unit 40.

The adjustable seatpost 42 is provided on a seat tube 16A, and is configured to change the height of a saddle. The adjustable seatpost 42 includes an electric seatpost and a mechanical seatpost. An electric seatpost is configured to be extended and retracted by the force of an electric actuator. A mechanical seatpost is configured to be extended by the force of at least one of a spring and air in a case where a valve is controlled by an electric actuator, and the seatpost is configured to be retracted in a case where human force is added. A mechanical seatpost includes a hydraulic seatpost or a hydraulic-pneumatic seatpost.

The suspension 44 absorbs shock applied to the human-powered vehicle 10 from the road surface on which the human-powered vehicle 10 is traveling and adjusts a stroke amount. Adjustment of the stroke amount is equivalent to adjustment of an entire length of the suspension 44. The position of the suspension 44 relative to the frame 16 is adjusted by adjusting the stroke amount. The overall length of the suspension 44 is adjusted, for example, in a range of a distance L1 shown in FIG. 4. The suspension 44 includes at least one of a front suspension 46 and a rear suspension 48. The front suspension 46 is configured to be provided between the frame 16 and the front wheel 12A of the human-powered vehicle 10. The front suspension 46 absorbs impacts added to the front wheel 12A. The rear suspension 48 is configured to be provided between a swingarm of the human-powered vehicle 10 and the rear wheel 12B. The rear suspension 48 absorbs impacts added to the rear wheel 12B.

The suspension 44 includes a first member 44A, a second member 44B, and an adjustment unit 60. The second member 44B is movable relative to the first member 44A. The adjustment unit 60 adjusts a relative movable amount of the first member 44A and the second member 44B. The entire length of the suspension 44 is adjusted by moving the second member 44B relative to the first member 44A. In one example, the first member 44A is an outer tube provided at the outer side of the second member 44B. In one example, the second member 44B is an inner tube provided at an inner side of the first member 44A. The relative movable amount is a maximum movable amount of the second member 44B relative to the first member 44A. The suspension 44 further includes a first chamber C1, a second chamber C2, and a flow passage R1. The first chamber C1 is defined by the first member 44A and the second member 44B. The second chamber C2 is defined by the first member 44A and the second member 44B. The flow passage R1 fluidly connects the first chamber C1 and the second chamber C2. In one example, the fluid is air and oil. A backflow prevention mechanism can further be provided in the flow passage R1 to prevent backflow of the fluid. One example of the backflow prevention mechanism is a valve.

The suspension 44 absorbs impacts with a damper adjustment unit. The dumper adjustment unit can include a fluid chamber, a storage chamber, a flow passage connecting the fluid chamber and the storage chamber, and an adjustment unit that opens and closes the flow passage. The adjustment unit includes an electric actuator and a valve.

The control device 50 is configured to control at least the entire length of the suspension 44. The control device 50 controls the adjustment unit 60. The control device 50 controls the adjustment unit 60 through wireless or wired communication. The control device 50 is provided on the suspension 44. The control device 50 includes an electronic controller 52. Hereinafter, the electronic controller 52 will be simply referred to as the controller 52. The term "electronic controller" as used herein refers to hardware that executes a software program, and does not include a human. The controller 52 is configured to electrically control the adjustment unit 60 in accordance with relative position information related to a relative position of the first member 44A and the second member 44B. The controller 52 includes one or more processors that execute predetermined control programs. Each processor preferably includes, for example, a central processing unit (CPU) or a micro-processing unit (MPU). When the controller 52 has more than one processors, the processors can be located at the same location (e.g., a single printed circuit board) or at one or more separate locations. Thus, the controller 52 can include one or more microcomputers.

The control device 50 further includes a storage 54 that stores table data indicating a corresponding relationship of predetermined relative position information and a predetermined relative movable amount. The storage 54 stores information used for various types of control programs and control processes. The storage 54 can be any a non-transitory computer readable medium or computer storage. The storage 54 includes, for example, a nonvolatile memory and a volatile memory. A non-volatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM). The controller 52 refers to the table data stored in the storage 54 and executes a control.

The predetermined relative position information is the relative position information of where the internal pressure of the first chamber C1 is in equilibrium with the internal pressure of the second chamber C2. In one example, in a case where the internal pressures are in equilibrium, the absolute value of the internal pressure difference is less than a predetermined value. The predetermined relative position information is predetermined in accordance with the predetermined relative movable amount of the first member 44A and the second member 44B. The predetermined relative movable amount represents the maximum movable amount of the second member 44B relative to the first member 44A targeted by the controller 52.

The control device 50 further includes a detector 56 that detects the relative position information. The term "detector" as used herein refers to a hardware device or instrument designed to detect the presence or absence of a particular event, object, substance, or a change in its environment, and to emit a signal in response. The term "detector" as used herein do not include a human. In one example, the detector 56 is configured by an ultrasonic sensor and an optical sensor. In another example, the detector 56 is configured by an encoder or a potentiometer. The detector 56 outputs the detected relative position information to the controller 52. The relative position information includes, for example, information related to the distance L1 between a surface P1 of the first member 44A and a surface P2 of the second member 44B in the first chamber C1. The detector 56 can be configured to detect the position of the second member 44B relative to the first member 44A, for example, by detecting a sensor provided on a surface P3 of the first member 44A in the first chamber C1. In one example, the relative position information includes information related to the distance between a sensor provided on the surface P1 and a sensor provided on the surface P3. The sensor detected by the detector 56 can be provided on a surface that forms an inner surface of the first member 44A other than the surface P3. Alternatively, the sensor detected by the detector 56 can be provided on a surface that forms the outer side of the second member 44B.

The adjustment unit 60 includes a valve 62 that opens and closes the flow passage R1. In the illustrated embodiment, the adjustment unit 60 can also be consider a positioning structure or a position adjuster. The adjustment unit 60 includes an electric actuator 64 that opens and closes the valve 62. The controller 52 controls the electric actuator 64. One example of the electric actuator 64 is a motor. In another example, the electric actuator 64 is a solenoid. For example, the adjustment unit 60 can include a fluid pump and be configured to adjust the volume of the fluid in the first chamber C1 and the second chamber C2. The controller 52 can control the valve in accordance with a comparison result of the predetermined relative position information and the relative position information of the first member 44A and the second member 44B.

The human-powered vehicle 10 further includes an operation device 70 that receives an input from a user. In the illustrated embodiment, the operation device 70 can also be consider a user operable input. The operation device 70 is configured to operate at least the suspension 44. The operation device 70 outputs input information from the user to the control device 50. The input information includes information related to switching between a locked state and an unlocked state and information related to changes in the relative position of the second member 44B. The operation device 70 can also be configured to control another component 36.

The human-powered vehicle 10 further includes a detection device 80 that obtains traveling information and traveling environment information related to the human-powered vehicle 10. The traveling information includes, for example, at least one of inclination of the human-powered vehicle 10 with respect to a pitch direction, cadence, torque, vehicle speed, acceleration, and power. The power is the product of the cadence and the torque. The traveling environment information includes road surface information related to a road surface. The road surface information includes information related to an inclination angle of the road surface on which the human-powered vehicle 10 travels and information related to obstacles on the traveling road surface. The detection device 80 is configured by at least one of a sensor that detects the traveling information and the traveling environment information and a receiver that obtains the information from an external device. Thus, term "detection device" as used herein refers to a hardware device or instrument designed to detect the presence or absence of a particular event, object, substance, or a change in its environment, and to emit a signal in response. The term "detection device" as used herein do not include a human.

A human-powered vehicle suspension control method for controlling the suspension 44 executed by the controller 52 will now be described. The suspension 44, which is controlled by the controller 52, includes the control device 50, the first member 44A, the second member 44B movable relative to the first member 44A, and the adjustment unit 60 that adjusts the relative movable amount of the first member 44A and the second member 44B.

The human-powered vehicle suspension control method for controlling the suspension 44 includes a detecting step, a comparing step, and a controlling step. While the human-powered vehicle suspension control method is described in terms of steps, the described steps of the human-powered vehicle suspension control method do not always require the described steps to be performed as distinct steps. For example, the detecting step and the comparing step can be performed in a manner in which they overlap. In other words, for example, the comparing step can be started before the detecting step has finished. In the detecting step, the relative position information related to the relative position of the first member 44A and the second member 44B is detected. In the comparing step, the relative position information and the predetermined relative position information are compared. In the controlling step, the adjustment unit 60 is controlled in accordance with the comparison result of the relative position information and the predetermined relative position information.

In the detecting step, the controller 52 obtains the relative position information detected by the detector 56. In the comparing step, the controller 52 refers to the table data stored in the storage 54 and determines whether the relative position information obtained in the detecting step is in correspondence with the predetermined relative position information, which corresponds to the predetermined relative movable amount. In the controlling step, the controller 52 controls the electric actuator 64 to open the valve 62 for a predetermined period so that fluid flows through the flow passage R1. The predetermined period is obtained in accordance with the relationship of the relative movable amount and the predetermined relative movable amount and stored in the storage 54 in advance as table data.

The method for controlling the suspension 44 further includes an evaluating step of evaluating an adjustment result of the relative movable amount resulting from the controlling step. The evaluating step includes a first evaluating step, a second evaluating step, and a third evaluating step. In the first evaluating step, pre-control relative position information is obtained in accordance with the relative position information detected during a first predetermined period prior to the controlling step. In the second evaluating step, post-control relative information is obtained in accordance with the relative position information detected during a second predetermined period subsequent to the controlling step. In the third evaluating step, the adjustment result is evaluated in accordance with the comparison result of the pre-control relative position information and the post-control relative information.

In the evaluating step, the controller 52 obtains the relative position information and determines whether to perform the controlling step. In the first evaluating step, the controller 52 obtains the pre-control relative position information from the relative position information detected by the detector 56 during the first predetermined period. The pre-control relative position information is the relative position information taken prior to the control of the adjustment unit 60 by the controller 52. The pre-control relative position information is the average value, or the median value of the relative position information detected during the first predetermined period. In the second predetermined period, the controller 52 obtains the post-control relative information from the relative position information detected by the detector 56 during the second predetermined period. The post-control relative information is the average value, or the median value of the relative position information detected during the second predetermined period. The first predetermined period and the second predetermined period can be set to any period of time. The post-control relative information is the relative position information taken subsequent to the control of the adjustment unit 60 by the controller 52. In the third evaluating step, the controller 52 determines whether to continue the control depending on if the absolute value of the difference between the difference of the pre-control relative position information and the post-control relative information and the difference of the predetermined relative movable amount and the relative movable amount is less than a predetermined value. In a case where the absolute value is less than the predetermined value, the controller 52 gives an affirmative determination and ends the control. In a case where the absolute value is greater than or equal to the predetermined value, the controller 52 gives a negative determination and continues the control. Hereinafter, the difference between the pre-control relative position information and the post-control relative information will be referred to as the position information difference, and the difference of the predetermined relative movable amount and the relative movable amount will be referred to as the movable amount difference.

The method for controlling the suspension 44 further includes a determining step of determining whether to start the detecting step. In the determining step, the determination of whether to start the detecting step is based on at least one of input information from a user, the traveling information of the human-powered vehicle 10, and the traveling environment information of the human-powered vehicle 10.

In the determining step, the controller 52 determines whether to perform the control method including the detecting step. In a case where the controller 52 gives an affirmative determination to start the detecting step, the controller 52 performs at least the detecting step, the comparing step, and the controlling step. Preferably, the controller 52 also performs the evaluating step.

Figure 5:
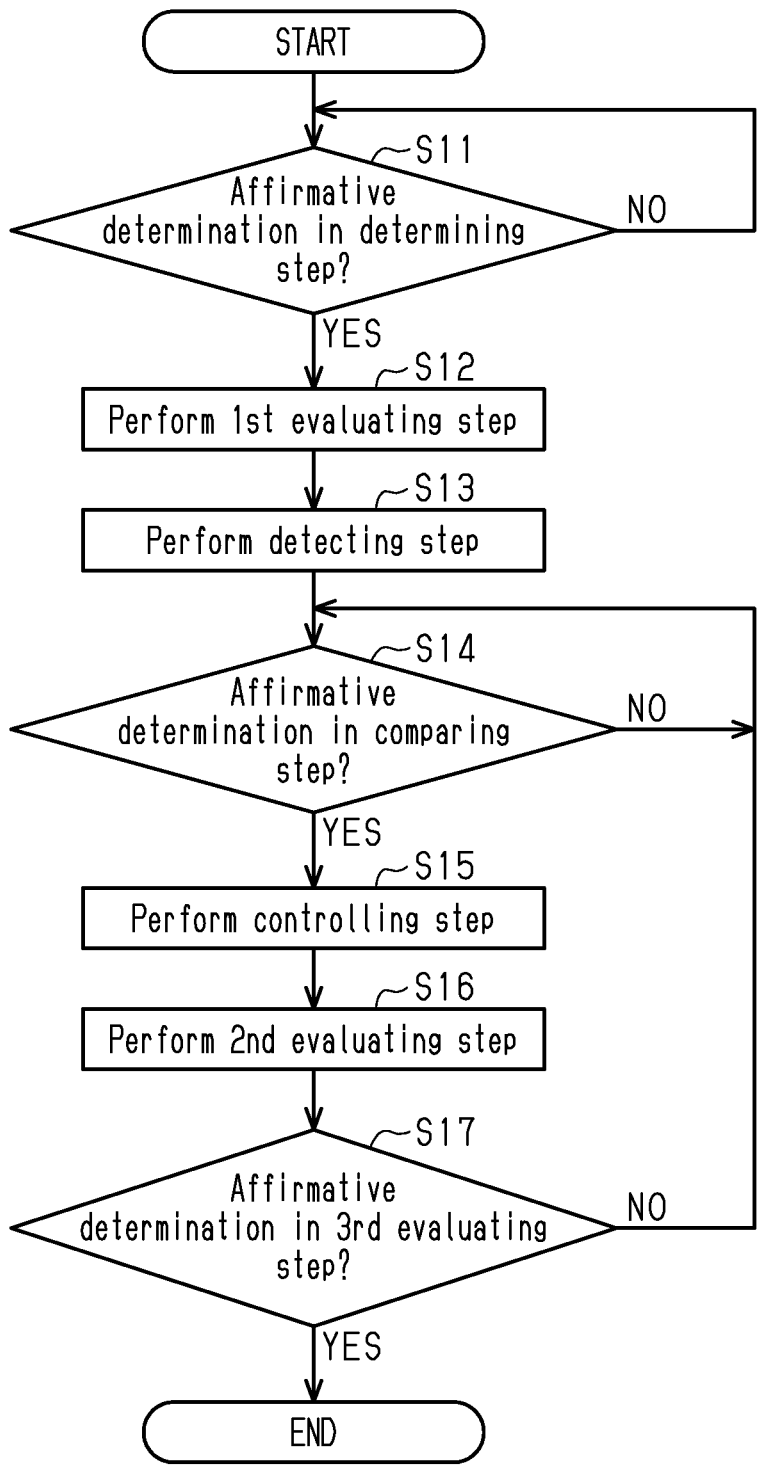
FIG. 5 is a flowchart illustrating one example of a control executed by the control device in accordance with the first embodiment.

One example of the control method performed by the controller 52 will now be described with reference to FIG. 5. The description exemplifies a case where the relative movable amount is greater than the predetermined relative movable amount. In one example, the relative movable amount is 150 mm. The predetermined relative movable amount is 130 mm.

In step S11, the controller 52 determines whether an affirmative determination has been given in the determining step. In a case where an affirmative determination has been given, the controller 52 performs step S12. In a case where a negative determination has been given, the controller 52 performs step S11 again.

In step S12, the controller 52 performs the first evaluating step. The controller 52 obtains the pre-control relative position information at a first predetermined time.

In step S13, the controller 52 performs the detecting step. The controller 52 obtains the present relative position information. In step S14, the controller 52 performs the comparing step. The controller 52 compares the present relative position information and the table data stored in the storage 54 and determines whether the present relative position information is in correspondence with the predetermined relative position information, which corresponds to the predetermined relative movable amount. In a case where an affirmative determination is given, the controller 52 performs step S15. In a case where a negative determination is given, the controller 52 performs step S14 again.

In step S15, the controller 52 performs the controlling step. The controller 52 controls the electric actuator 64 to open the valve 62 for a predetermined period. In a case where the predetermined period elapses, the controller 52 controls the electric actuator 64 to close the valve 62 and then performs step S16.

In step S16, the controller 52 obtains the post-control relative information at a second predetermined time. In step S17, the controller 52 performs the third evaluating step. In a case where the controller 52 gives an affirmative determination in the third evaluating step, the controller 52 ends the control. In a case where the controller 52 gives a negative determination in the third evaluating step, the controller 52 performs step S14 again.

While the human-powered vehicle 10 is traveling, as long as the electric power is supplied from the battery 34, the controller 52 is configured to perform the process from step S11 to step S17 in predetermined cycles.

One example of the determining step performed by the controller 52 will now be described with reference to FIG. 6.

In step S21, the controller 52 determines whether the operation device 70 has been operated. Specifically, the controller 52 determines whether input information has been received from the operation device 70. In a case where the controller 52 determines that the operation device 70 has been operated, the controller 52 performs step S25. In a case where the controller 52 determines that the operation device 70 has not been operated, the controller 52 performs step S22.

In step S22, the controller 52 determines whether to perform the detecting step. In one example, the controller 52 determines whether to perform the detecting step based on at least one of the traveling information and the traveling environment information. One example of the traveling information referred by the controller 52 is information on whether the human-powered vehicle 10 is inclined. One example of the traveling environment information referred by the controller 52 is information on whether the road surface on which the human-powered vehicle 10 travels is inclined by a predetermined angle or greater. In another example, the traveling environment information referred by the controller 52 is information on whether an obstacle is on the road surface on which the human-powered vehicle 10 travels. In a case where the controller 52 determines to perform the detecting step, the controller 52 performs step S23. In a case where the controller 52 determines not to perform the detecting step, the controller 52 performs step S26.

In step S23, the controller 52 performs the detecting step and obtains the relative position information. In step S24, the controller 52 determines whether to give an affirmative determination. The controller 52 determines whether at least one of the traveling information and the traveling environment information used for the determination in step S22 corresponds to the relative position information. The traveling information corresponds to the relative position information, for example, in a case where the position of the second member 44B is suitable for the inclination state. In one example, for a case where the human-powered vehicle 10 is traveling uphill, the position of the second member 44B is determined as being suitable if the distance corresponding to the relative position information is short. The traveling environment information and the relative position information are in correspondence, for example, in a case where the position of the second member 44B is suitable for the traveling environment. In one example, for a case where the human-powered vehicle 10 is traveling uphill or about to start traveling uphill, the position of the second member 44B is determined as being suitable if the distance corresponding to the relative position information is short. The table data indicating the corresponding relationship of the relative position information and at least one of the traveling information and the traveling environment information is stored in the storage 54. The controller 52 refers to the table data stored in the storage 54 to determine whether the traveling information or the traveling environment information corresponds to the relative position information.

In step S25, the controller 52 gives an affirmative determination. After giving the affirmative determination, the controller 52 performs, for example, the process illustrated in FIG. 5 from step S12. In step S26, the controller 52 gives a negative determination. After giving the negative determination, the controller 52 performs, for example, the process step S21 again. While the human-powered vehicle 10 is traveling, as long as electric power is supplied from the battery 34, the controller 52 is configured to perform the process from step S21 to step S26 in predetermined cycles.

Second Embodiment

The control device 50, the suspension 44, and the method for controlling the suspension 44 of a second embodiment are configured in the same manner as the control device 50, the suspension 44, and the method for controlling the suspension 44 of the first embodiment except for the order of the steps of the control method performed by the control device 50 and the control content of the control steps executed by the controller 52. Thus, same reference numerals are given to those components that are the same as the corresponding components of the first embodiment and such components will not be described in detail.

Figure 7:
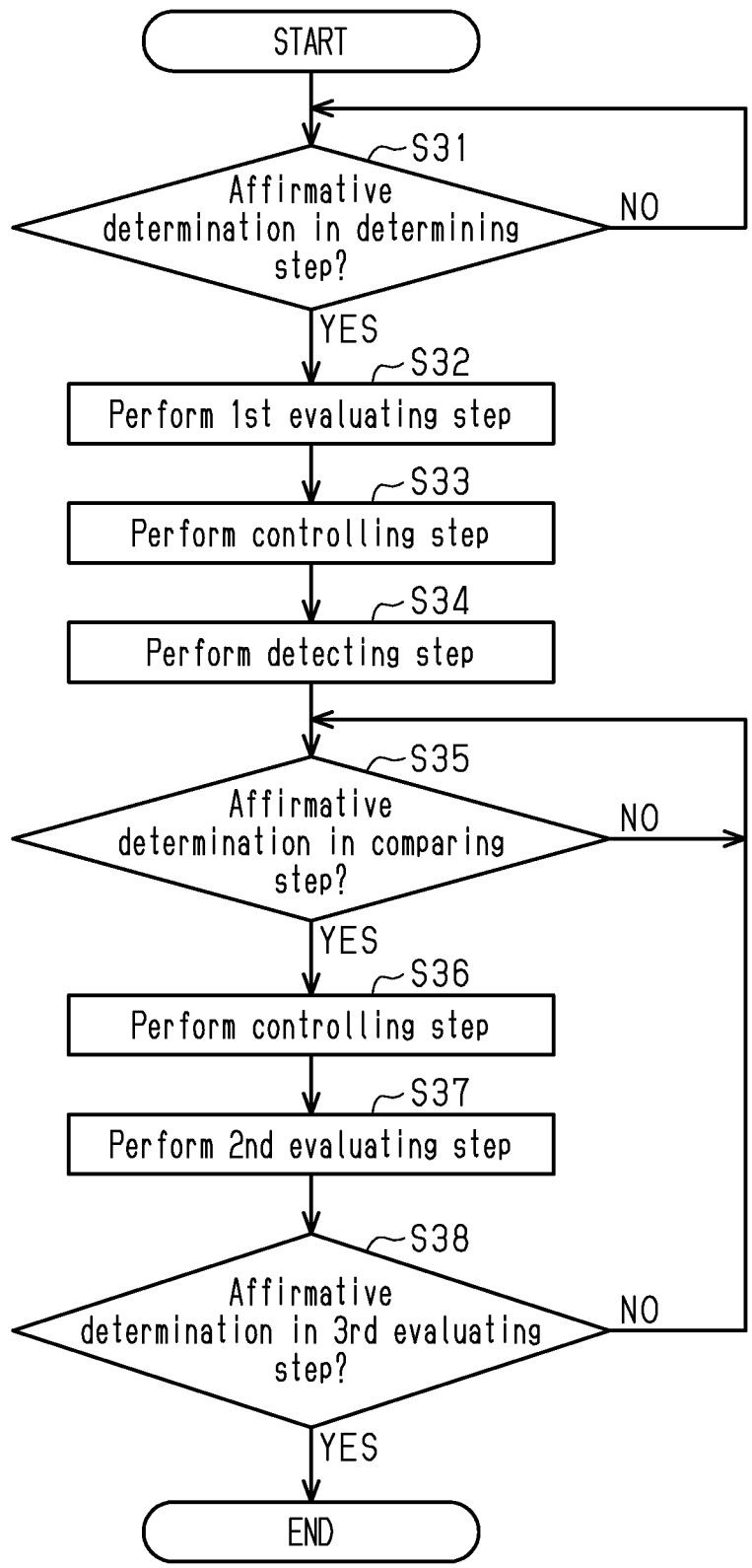
FIG. 7 is a flowchart illustrating one example of a control executed by a control device in accordance with a second embodiment.

One example of the control method performed by the controller 52 in accordance with the second embodiment will now be described with reference to FIG. 7.

In step S31, the controller 52 determines whether an affirmative determination has been given in the determining step. In a case where an affirmative determination has been given, the controller 52 performs step S32. In a case where a negative determination has been given, the controller 52 performs step S31 again. In step S32, the controller 52 performs the first evaluating step. The controller 52 obtains the pre-control relative position information at a first predetermined time.

In step S33, the controller 52 performs the controlling step. In the controlling step of the second embodiment, the controller 52 controls the electric actuator 64 to open the valve 62 so that the fluid flows through the flow passage R1.

In step S34, the controller 52 performs the detecting step. The controller 52 obtains the present relative position information. In step S35, the controller 52 performs the comparing step. The controller 52 compares the present relative position information and the table data stored in the storage 54 and determines whether the present relative position information is in correspondence with the predetermined relative position information, which corresponds to the predetermined relative movable amount. In a case where an affirmative determination is given, the controller 52 performs step S36. In a case where a negative determination is given, the controller 52 performs step S34 again.

In step S36, the controller 52 performs the controlling step. In the controlling step of the second embodiment, the controller 52 controls the electric actuator 64 to close the valve 62 so that the fluid does not flow through the flow passage R1.

In step S37, the controller 52 performs the second evaluating step and obtains the post-control relative information at a second predetermined time. In step S38, the controller 52 performs the third evaluating step. In a case where the controller 52 gives an affirmative determination in the third evaluating step, the controller 52 ends the control. In a case where the controller 52 gives a negative determination in the third evaluating step, the controller 52 performs step S35 again.

While the human-powered vehicle 10 is traveling, as long as electric power is supplied from the battery 34, the controller 52 is configured to perform the process from step S31 to step S37 in predetermined cycles.

Third Embodiment

The control device 50, the suspension 44, and the method for controlling the suspension 44 of a third embodiment are configured in the same manner as the control device 50, the suspension 44, and the method for controlling the suspension 44 of the first and second embodiments except for the order and the content of the control steps of the control method. Thus, same reference numerals are given to those components that are the same as the corresponding components of the first and second embodiments and such components will not be described in detail.

Figure 8:
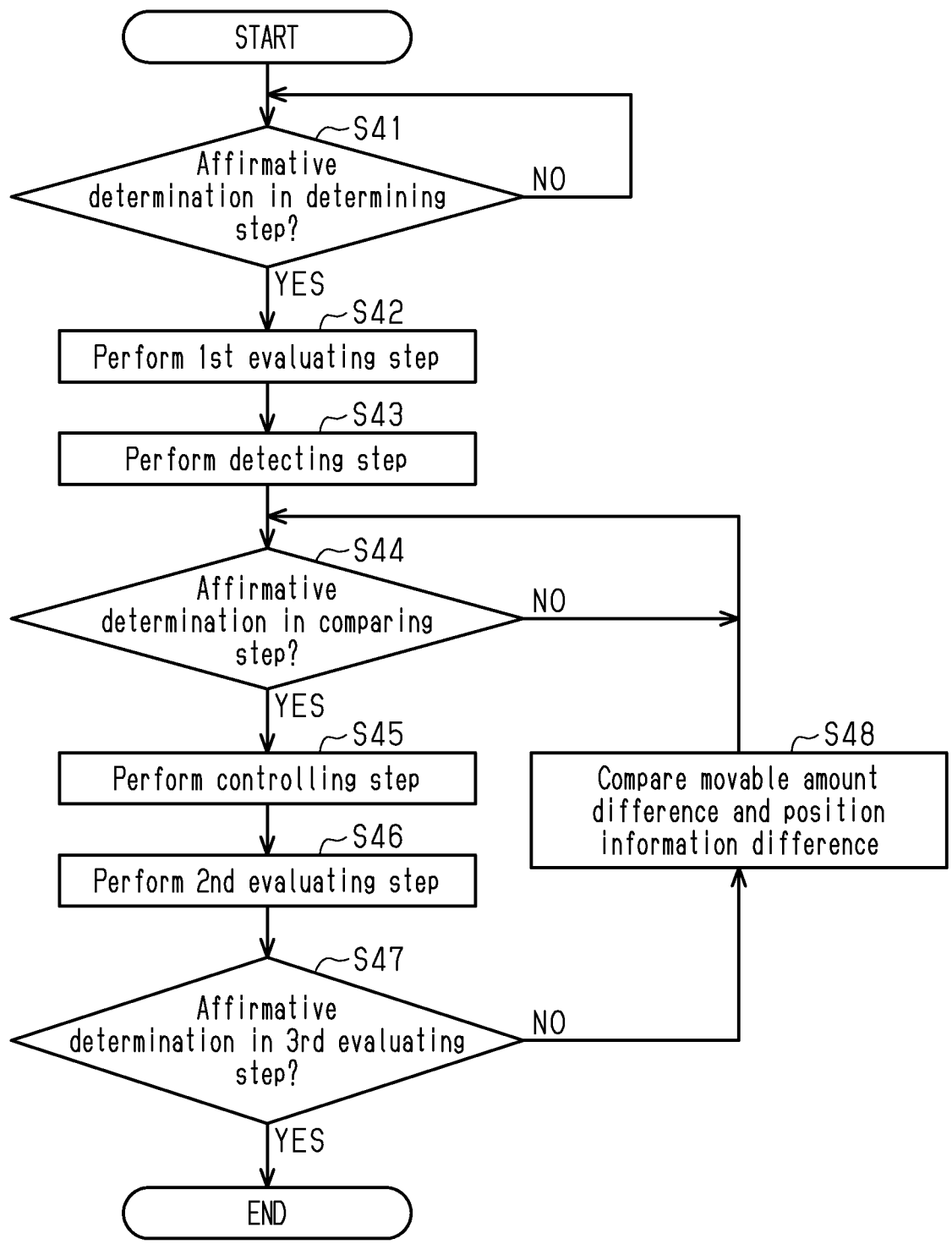
FIG. 8 is a flowchart illustrating one example of a control executed by a control device in accordance with a third embodiment.

One example of the control method performed by the controller 52 in accordance with the third embodiment will now be described with reference to FIG. 8.

In step S41, the controller 52 determines whether an affirmative determination has been given in the determining step. In a case where an affirmative determination has been given, the controller 52 performs step S42. In a case where a negative determination has been given, the controller 52 performs step S41 again. In step S42, the controller 52 performs the first evaluating step. The controller 52 obtains the pre-control relative position information at a first predetermined time. In step S43, the controller 52 performs the detecting step. The controller 52 obtains the present relative position information.

In step S44, the controller 52 performs the comparing step. In the comparing step of the third embodiment, the controller 52 compares the present relative position information with the relative position, at which the internal pressures will be in equilibrium with each other under the present relative movable amount. In a case where the distance corresponding to the present relative position information is shorter, the controller 52 performs step S45. In a case where the distance corresponding to the relative position, at which the internal pressures will be in equilibrium with each other under the present relative movable amount, is shorter, the controller 52 performs step S44 again.

In step S45, the controller 52 performs the controlling step. The controller 52 controls the electric actuator 64 to open the valve 62 for a predetermined period. In a case where the predetermined period elapses, the controller 52 controls the electric actuator 64 to close the valve 62 and then performs step S46. In step S46, the controller 52 obtains the post-control relative information at a second predetermined time.

In step S47, the controller 52 performs the third evaluating step. In a case where the controller 52 gives an affirmative determination in the third evaluating step, the controller 52 ends the control. In a case where the controller 52 gives a negative determination, the controller 52 performs step S48. In step S48, the controller 52 compares the movable amount difference and the position information difference. In a case where the movable amount difference is smaller than the position information difference, the controller 52 performs step S44 again. In a case where the movable amount difference is greater, the controller 52 changes step S44 so that step S45 is performed if the distance corresponding to the present relative position information is longer.

Modifications

The description related with the above embodiments exemplifies, without any intention to limit, an applicable form of a control device, a suspension, and a method for controlling the suspension according to the present disclosure. In addition to the control device, the suspension, and the method for controlling the suspension described above, the control device, the suspension, and the control method in accordance with the present disclosure are applicable to modifications of the above embodiments that are described below and combinations of at least two of the modifications that do not contradict each other. In the modifications described hereafter, same reference numerals are given to those components that are the same as the corresponding components of the above embodiments and such components will not be described in detail.

At least one element of the control device 50 can be provided on the human-powered vehicle 10. In one example, at least one of the controller 52 and the storage 54 is provided on the frame 16 of the human-powered vehicle 10. The controller 52 and the storage 54 establish communication with the detector 56 and the adjustment unit 60 through wireless or wired connection. The controller 52 and the storage 54 can be configured to establish communication with at least one of the operation device 70 and the detection device 80 through wireless communication.

The electric power can be supplied to the control device 50 from an electric power generator provided on the human-powered vehicle instead of or in addition to the battery 34. An electric power generator includes, for example, at least one of a hub dynamo, a block dynamo, an assist regenerative mechanism, and a vibration power generation element.

The table data can include any value input by a user. Alternatively, the table data can include a learning model. A learning model is produced from, for example, relative position information and a relative movable amount that are obtained in advance. The controller 52 inputs the relative position information obtained from the detector 56 into a learning model. The controller 52 obtains information related to a predetermined relative movable amount from the learning model.

Figure 6:
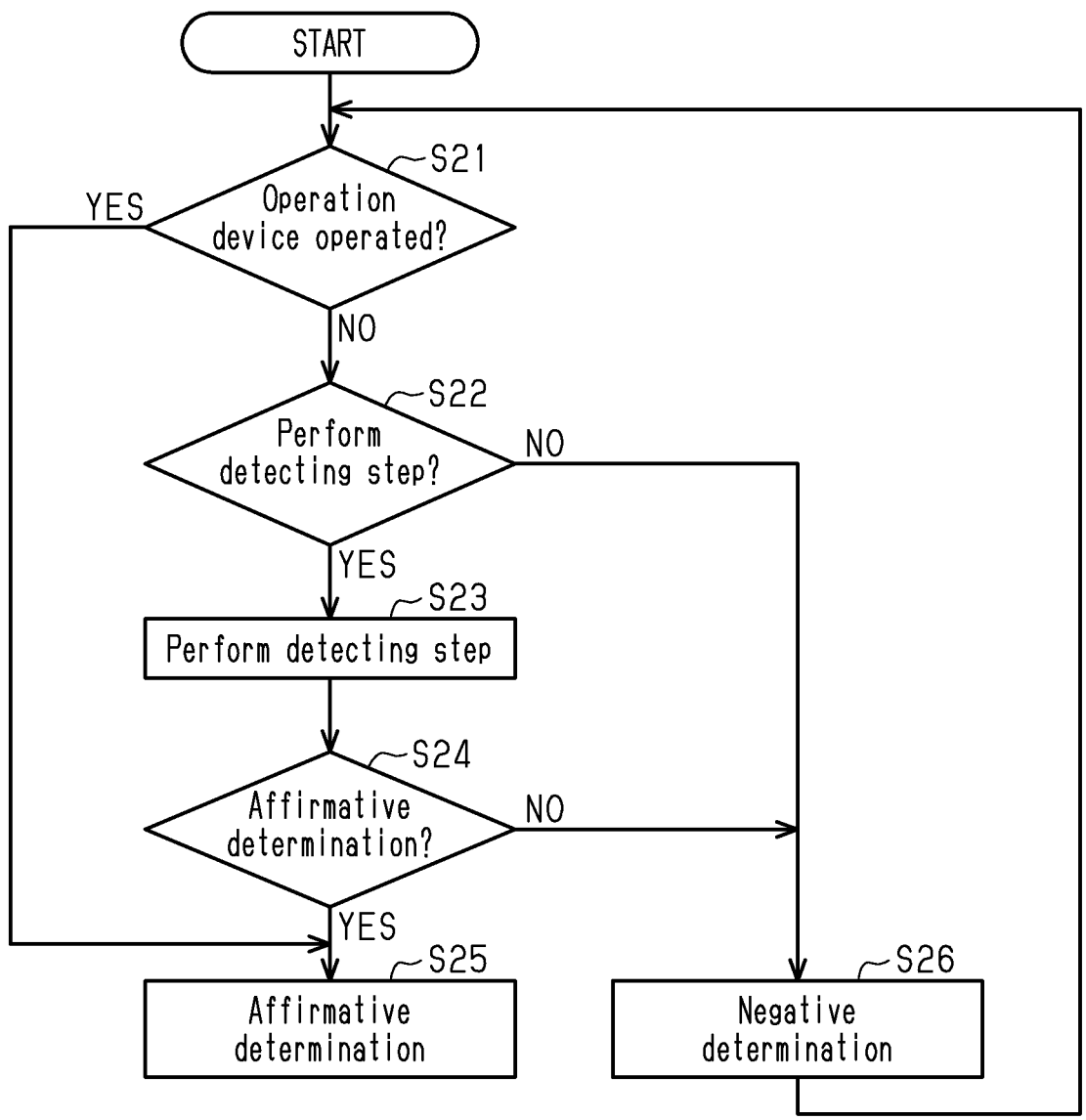
FIG. 6 is a flowchart illustrating one example of a control executed by the control device in accordance with the first embodiment.

The controller 52 can be configured not to perform one of step S21 and step S22 in the determining step illustrated in FIG. 6.

In each embodiment, the controller 52 can be configured not to perform at least one of the first evaluating step, the second evaluating step, and the third evaluating step. In the first embodiment, the controller 52 can omit at least one of step S12, step S16, and step S17. In the second embodiment, the controller 52 can omit at least one of step S32, step S37, and step S38. In the third embodiment, the controller 52 can omit at least one of step S42, step S46, and step S47.

In each embodiment, in a case where a backflow prevention mechanism is provided in the flow passage R1, the controller 52 can be configured to control the backflow prevention mechanism at least one of before, during, and after performing the controlling step. The controller 52 can also be configured to perform a checking step to check whether backflow of the fluid is restricted by the backflow prevention mechanism.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control device for a suspension of a human-powered vehicle, the suspension includes a first member, a second member telescopically attached to the first member to be telescopically movable relative to the first member, and an adjuster adjusting a relative movable amount of the first member and the second member, the adjuster including a valve that opens and closes the flow passage, the adjuster further including an electric actuator that opens and closes the valve, the actuator being positioned internally of the first and second members, the control device comprising:
    an electronic controller configured to electrically control the adjuster in accordance with relative position information related to a relative position of the first member and the second member.

2. The control device according to claim 1, further comprising
    a detector configured to detect the relative position information.

3. The control device according to claim 1, wherein
    the suspension further includes a first chamber defined by the first member and the second member, a second chamber defined by the first member and the second member, and a flow passage fluidly connecting the first chamber and the second chamber;
    and
    the electronic controller is configured to control the valve in accordance with the relative position information.

4. The control device according to claim 3, wherein
    the electronic controller is configured to control the valve in accordance with a comparison result of predetermined relative position information of the first member and the second member and the relative position information.

5. The control device according to claim 4, wherein
    the predetermined relative position information is predetermined in accordance with a predetermined relative movable amount of the first member and the second member.

6. The control device according to claim 5, further comprising
    a storage that stores table data indicating a corresponding relationship of the predetermined relative position information and the predetermined relative movable amount.

7. The control device according to claim 3, wherein
    the electronic controller is configured to control the electric actuator.

8. A human-powered vehicle suspension comprising the control device according to claim 1, and further comprising:
    the first member;
    the second member telescopically movable relative to the first member; and
    the adjuster adjusting the relative movable amount of the first member and the second member.

9. A suspension control method for controlling a suspension for a human-powered vehicle, the suspension includes a first member, a second member movable relative to the first member, and an adjuster adjusting a relative movable amount of the first member and the second member, the suspension control method comprising:
    detecting relative position information related to relative position of the first member and the second member;
    comparing the relative position information and predetermined relative position information; and
    controlling the adjuster in accordance with a comparison result of the relative position information and the predetermined relative position information; and
    evaluating an adjustment result of the relative movable amount resulting from the controlling of the adjuster, the evaluating of the adjustment result further including
    obtaining pre-control relative position information in accordance with the relative position information detected during a first predetermined period prior to the controlling of the adjuster,
    obtaining post-control relative information in accordance with the relative position information detected during a second predetermined period subsequent to the controlling of the adjustment unit, and
    evaluating the adjustment result in accordance with a comparison result of the pre-control relative position information and the post-control relative position information.

10. The suspension control method according to claim 9, further comprising
    determining whether to start the detecting of the relative position information.

11. The suspension control method according to claim 10, wherein
    the determining of whether to start the detecting of the relative position information is based on at least one of input information from a user, traveling information of the human-powered vehicle, and traveling environment information of the human-powered vehicle.

* * * * *